United States Patent
Pezzo et al.

(10) Patent No.: US 12,196,371 B2
(45) Date of Patent: Jan. 14, 2025

(54) VALVE WITH INTEGRATED PRESSURE REGULATOR

(71) Applicant: Lincoln Global, Inc., Santa Fe Springs, CA (US)

(72) Inventors: Ivan P. Pezzo, Verona (IT); Marco Arzenton, Verona (IT); Silvano M. Bendazzoli, Verona (IT); Lucia Travagliati, Verona (IT)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 8 days.

(21) Appl. No.: 17/874,411

(22) Filed: Jul. 27, 2022

(65) Prior Publication Data

US 2023/0044925 A1 Feb. 9, 2023

Related U.S. Application Data

(60) Provisional application No. 63/229,087, filed on Aug. 4, 2021.

(51) Int. Cl.
*F17C 13/04* (2006.01)
*F16K 31/60* (2006.01)

(52) U.S. Cl.
CPC .......... *F17C 13/04* (2013.01); *F16K 31/602* (2013.01); *F17C 2205/0329* (2013.01);
(Continued)

(58) Field of Classification Search
CPC . F17C 13/04; F17C 2205/0329; F16K 31/602
See application file for complete search history.

(56) References Cited

U.S. PATENT DOCUMENTS

| 2,243,781 | A | * | 5/1941 | Thornhill | G05D 16/18 91/461 |
| 2,791,397 | A |   | 9/1956 | Holst-Coffmann | |

(Continued)

FOREIGN PATENT DOCUMENTS

| DE | 198 43 669 C1 | 3/2000 |
| DE | 101 07 187 A1 | 8/2002 |

(Continued)

OTHER PUBLICATIONS

Extended European Search Report from Corresponding Application No. EP22188368.9; Dated Feb. 8, 2023; pp. 1-11.

*Primary Examiner* — Kenneth Rinehart
*Assistant Examiner* — Nicole Gardner
(74) *Attorney, Agent, or Firm* — Brad C. Spencer

(57) ABSTRACT

A regulating valve device for a fluid cylinder includes a shut off valve having a ball tappet that actuates the shut off valve. A lever has a cam surface that interacts with the ball tappet as the lever is rotated to translate the ball tappet linearly and actuate the shut off valve. The lever is rotatable from a first valve closed position through a valve open position to a second valve closed position such that the valve open position is intermediate of the first and second valve closed positions. A pressure or flow regulating valve is downstream of the shut off valve. A handwheel is operatively connected to the pressure or flow regulating valve to adjust an outlet pressure of the pressure or flow regulating valve. The handwheel has an axis of operation that is offset from a longitudinal axis of the fluid cylinder by an acute angle.

19 Claims, 16 Drawing Sheets

(52) U.S. Cl.
CPC ............... *F17C 2205/0332* (2013.01); *F17C 2205/0338* (2013.01); *F17C 2205/0382* (2013.01)

(56) References Cited

U.S. PATENT DOCUMENTS

| | | | |
|---|---|---|---|
| 4,199,130 | A | 4/1980 | Stoll et al. |
| 5,406,988 | A | 4/1995 | Hopkins |
| 5,479,966 | A | 1/1996 | Tison et al. |
| 5,975,121 | A | 11/1999 | Arzenton et al. |
| 6,105,598 | A * | 8/2000 | Cabrera ............... F17C 13/045 137/907 |
| 6,167,908 | B1 | 1/2001 | Rottger |
| 9,205,286 | B2 | 12/2015 | Mele |
| 9,709,188 | B2 | 7/2017 | Williams et al. |
| 10,132,448 | B2 | 11/2018 | Pemberton |
| 10,578,250 | B2 * | 3/2020 | Lamiable ............... F17C 13/04 |
| 2016/0179107 | A1 | 6/2016 | Pemberton |

FOREIGN PATENT DOCUMENTS

| | | | | |
|---|---|---|---|---|
| EP | 0 990 825 | A1 | 4/2000 | |
| EP | 3 002 499 | A1 | 4/2016 | |
| GB | 1 258 958 | A | 1/1972 | |
| GB | 2 514 360 | A | 11/2014 | |
| GB | 2553185 | A | 2/2018 | |
| WO | WO-2005085689 | A1 * | 9/2005 | ........... F16K 15/183 |
| WO | 2009/077520 | A1 | 6/2009 | |
| WO | 2016/041878 | A1 | 3/2016 | |
| WO | 2016/156519 | A1 | 6/2016 | |

* cited by examiner

VALVE WITH INTEGRATED PRESSURE REGULATOR

CROSS-REFERENCE TO RELATED APPLICATIONS

The present application claims priority to U.S. Provisional Patent Application Ser. No. 63/229,087 filed on Aug. 4, 2021, the disclosure of which is incorporated herein by reference.

BACKGROUND OF THE INVENTION

Field of the Invention

The present invention relates to valves for controlling the pressure or flow of pressurized fluid (e.g., gas and/or liquid) from a tank or cylinder. In particular, the present invention relates to a VIPR (valve with integrated pressure regulator).

Description of Related Art

A VIPR, or valve with integrated pressure regulator, can be used to control the flow rate or pressure of a fluid such as a gas discharged from a storage cylinder. A typical VIPR has an ON/OFF device to start and stop the flow of gas from the cylinder, a pressure gauge or content indicator that informs a user of the current pressure in the cylinder, a knob for setting the discharge flow rate/pressure from the cylinder, and filling and discharge ports. Gas cylinders come in various sizes, such as from approximately 12 inches high to over 60 inches high. Conventional VIPRs may be more ergonomically suitable for certain sizes of cylinders as compared to other sizes. For example, some VIPRs might be more easily operated on smaller cylinders than larger cylinders due to the location of the ON/OFF device or the flow control knob on the VIPR. It would be desirable to provide a VIPR that is ergonomically suitable for a range of cylinder sizes, such as from approximately 12 inches high to over 60 inches high.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a regulating valve device for a fluid cylinder. The regulating valve device includes a shut off valve having a ball tappet that actuates the shut off valve. A lever has a cam surface that interacts with the ball tappet as the lever is rotated to translate the ball tappet linearly and actuate the shut off valve. The lever is rotatable from a first valve closed position through a valve open position to a second valve closed position such that the valve open position of the lever is intermediate of the first valve closed position and the second valve closed position. A pressure or flow regulating valve is downstream of the shut off valve. A handwheel is operatively connected to the pressure or flow regulating valve to adjust a setting, such as an outlet pressure, of the pressure or flow regulating valve. The handwheel has an axis of operation that is offset from a longitudinal axis of the fluid cylinder by an acute angle.

In accordance with another aspect of the present invention, provided is a regulating valve device for a fluid cylinder. The regulating valve device includes a main body and a shut off valve having a ball tappet located within the main body that actuates the shut off valve. A residual pressure valve is located within the main body and is configured to supply fluid from the fluid cylinder to the shut off valve. A lever extends from the main body and has a cam surface that interacts with the ball tappet as the lever is rotated to translate the ball tappet linearly within the main body. The lever is rotatable from a first valve closed position through a valve open position to a second valve closed position such that the valve open position of the lever is intermediate of the first valve closed position and the second valve closed position. A pressure or flow regulating valve is downstream of the shut off valve and is located higher along the main body than each of the shut off valve, the ball tappet, and the residual pressure valve.

In accordance with another aspect of the present invention, provided is a regulating valve device for a fluid cylinder. The regulating valve device includes a main body and a shut off valve having a ball tappet located within the main body that actuates the shut off valve. A residual pressure valve is located within the main body and coaxial with the shut off valve. A lever extends from the main body and has a cam surface that interacts with the ball tappet as the lever is rotated to translate the ball tappet linearly within the main body. The lever is downwardly rotatable from a first valve closed position through a valve open position to a second valve closed position such that the valve open position of the lever is intermediate of the first valve closed position and the second valve closed position. A pressure or flow regulating valve is downstream of the shut off valve and is located higher along the main body than each of the shut off valve, the ball tappet, and the residual pressure valve. A handwheel is operatively connected to the pressure or flow regulating valve to adjust a setting, such as an outlet pressure, of the pressure or flow regulating valve. The handwheel has an axis of operation that is offset from a longitudinal axis of the fluid cylinder by an acute angle. The shut off valve and the residual pressure valve are oriented transverse to the longitudinal axis of the fluid cylinder.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
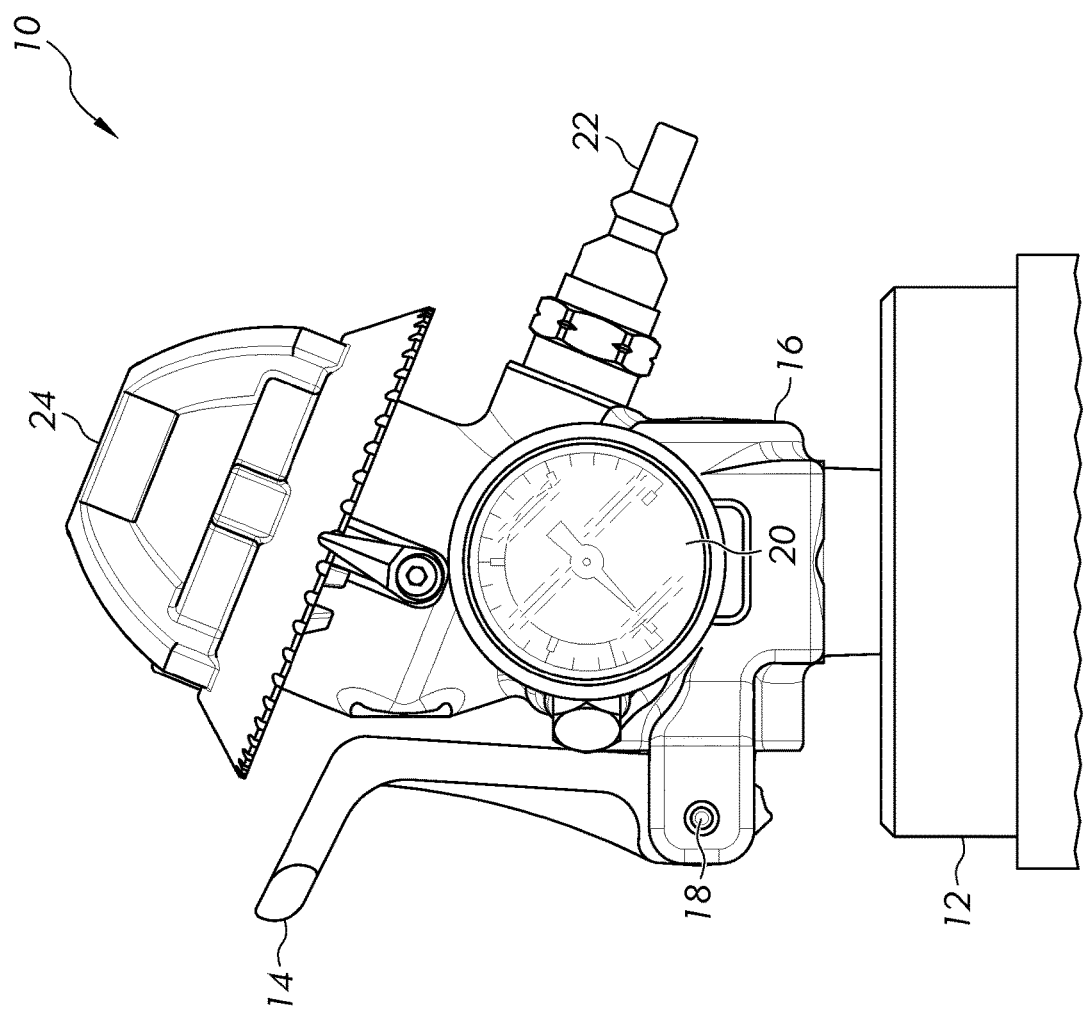
FIG. 1 shows a VIPR.

The present invention relates valves for controlling the pressure or flow of pressurized fluid from a tank or cylinder, and in particular to VIPRs. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

The terms "cylinder" and "tank" are used interchangeably herein and both refer to a storage vessel for a fluid, such as a liquid and/or gas. Storage cylinders/tanks can have a generally cylindrical shape as is known in the art, or other non-cylindrical shapes. The terms "cylinder" and "tank" also include smaller fluid storage vessels commonly referred to as "bottles" (e.g., gas bottles).

FIG. 1 shows an example VIPR 10 mounted atop a gas tank or cylinder 12. The VIPR 10 includes a shut off or isolation valve that is operated by a lever 14. The shut off valve is located within the main body 16 of the VIPR and selectively allows or prevents pressurized gas from flowing out of the cylinder and through the VIPR 10, depending on the position of the lever 14. The lever 14 is attached to the VIPR body 16 by a lever hinge pin 18 located at a lower portion of the VIPR body near the gas cylinder 12. In an example embodiment, the shut off valve is located adjacent the lever 14 and hinge pin 18, also at a lower portion of the VIPR body 16 near the gas cylinder 12. Placing the shut off valve at a lower portion of the VIPR body 16 puts the high pressure portion of the VIPR 10 low on the VIPR and near the gas cylinder 12. This serves to protect the high pressure portion of the VIPR 10 from external hits and shocks and improves the toughness of the VIPR. At least one of a pressure reducing/regulating valve or flow control valve (e.g., a pressure or flow regulating valve) is also located within the VIPR body 16, downstream of the shut off valve. A knob or handwheel 24 is operatively connected to the pressure or flow regulating valve to manually adjust a pressure or flow setting of the regulating valve. That is, the setting of the pressure or flow regulating valve is manually controlled via handwheel 24. It can be seen that the handwheel 24 has an axis of operation that is offset from a longitudinal axis of the gas cylinder 12 (e.g., tilted downward from the vertical axis of the gas cylinder by an acute angle). In further embodiments, the VIPR 10 can have a pre-set outlet pressure regulation (e.g., a fixed outlet pressure) rather than having a handwheel to adjust the pressure/flow.

Figure 14:
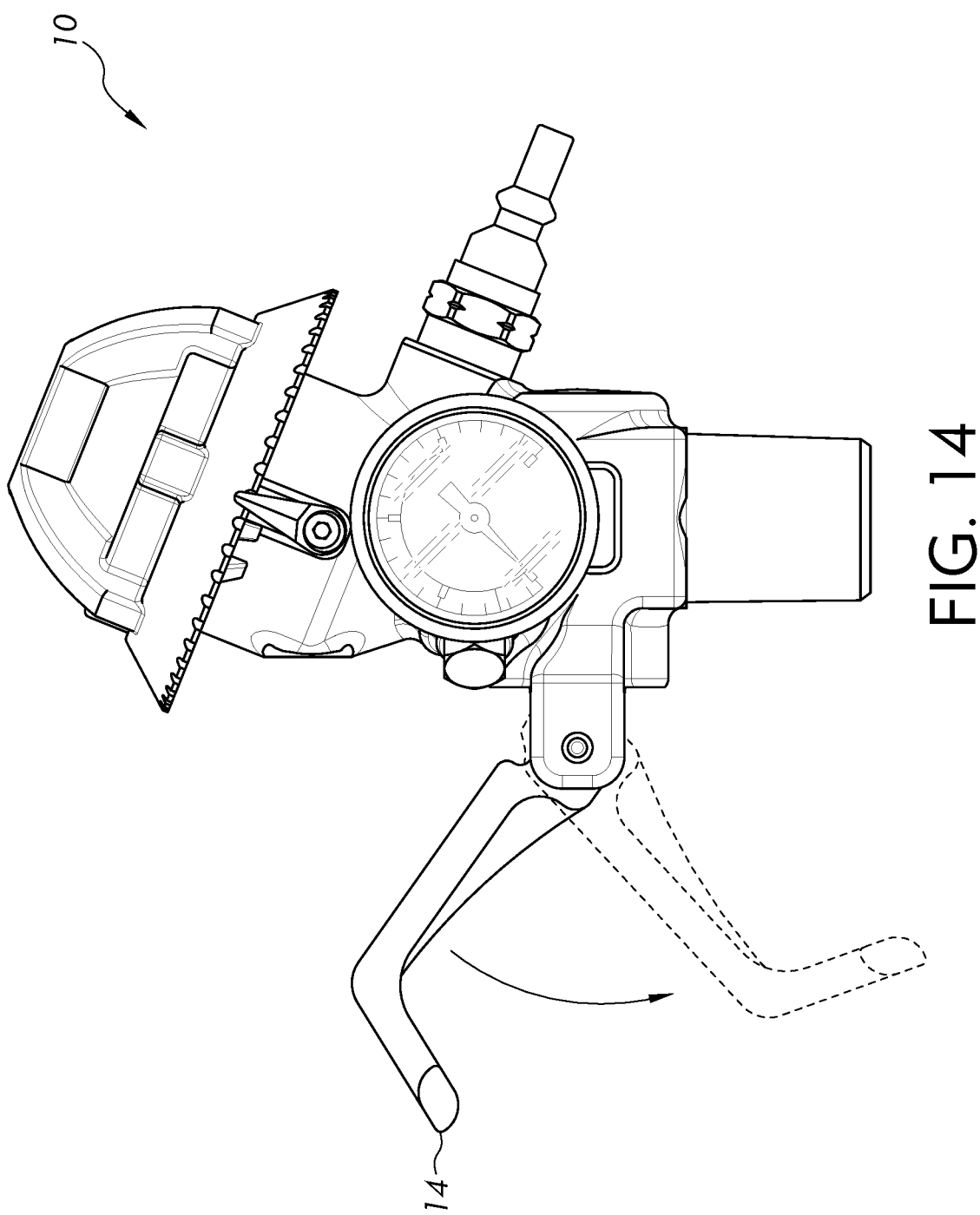
FIG. 14 illustrates an operation of an ON/OFF lever of the VIPR.

The lever 14 is shown in a generally vertical, upward shut off or valve closed position. The on or valve open position of the lever 14, which opens the shut off valve, is rotationally downward to a generally horizontal lever position. The lever 14 has a further shut off or valve closed position, which is rotationally downward from the horizontal open position. Thus, the lever 14 has two shut off positions, vertically up and down, and a single horizontal open position. The lever 14 is rotatable from a first valve closed position, which is shown in FIG. 1, through a valve open position to a second valve closed position such that the valve open position of the lever is intermediate of the first valve closed position and the second valve closed position. In the example embodiment shown in the figures, the lever 14 is downwardly rotatable from the first valve closed position through the valve open position and to the second valve closed position, around a generally horizontally oriented lever hinge pin 18. However, in further embodiments, the lever could be operated by rotation in other directions, such as by rotation other than within the vertical plane. The upward shut off position shown in FIG. 1 is intended to be a standard closing position for the lever 14, whereas the downward shut off position is intended for an emergency shut off of the VIPR 10. Having a downward shut off position allows the lever 14 to be slapped downward by an operator from the generally horizontal open position to the downward shut off position to quickly stop the flow of gas from the cylinder 12. Conventional VIPRs are opened by raising the lever and closed by moving the lever downward, and in an emergency situation an operator may instinctively try to close the valve by moving the lever downward. The VIPR 10 accommodates a conventional downward shut off. The ON/OFF status of the VIPR 10 will be clearly visible to an operator based on the position of the lever 14, and the lever 14 allows the shut off valve within the VIPR 10 to be opened and closed quickly by the operator. Further, when the lever 14 is in a horizontal valve open position, it could appear similar to a hook and a person may mistakenly attempt to hang something from the lever. Or an object could fall onto the lever 14 from above. Either scenario will usually result in the lever 14 dropping to the second valve closed position rather than damaging the lever or VIPR or tipping over the gas cylinder 12. The intermediate valve open position of the lever 14 and its lower second valve closed position are shown in FIG. 14.

The VIPR 10 includes a pressure gauge or content indicator 20 mounted to a front surface of the VIPR. The content indicator 20 informs the operator of the remaining gas pressure in the cylinder 12. The VIPR 10 further includes a discharge port for attaching a hose or conduit or other devices to a downstream process. In certain embodiments, the discharge port can have a quick connect fitting 22, although other types of fittings (e.g., threaded) can be used if desired. The fitting 22 could have a standard or proprietary shape and/or could integrate various functions (e.g. a no-return valve, check valve, demanding valve, calibrated hole, etc.) The pressure or flow rate of the fluid discharged from the cylinder 12 through the discharge port is controlled by the regulating valve in the VIPR 10 according to the handwheel 24 setting.

Figure 2:
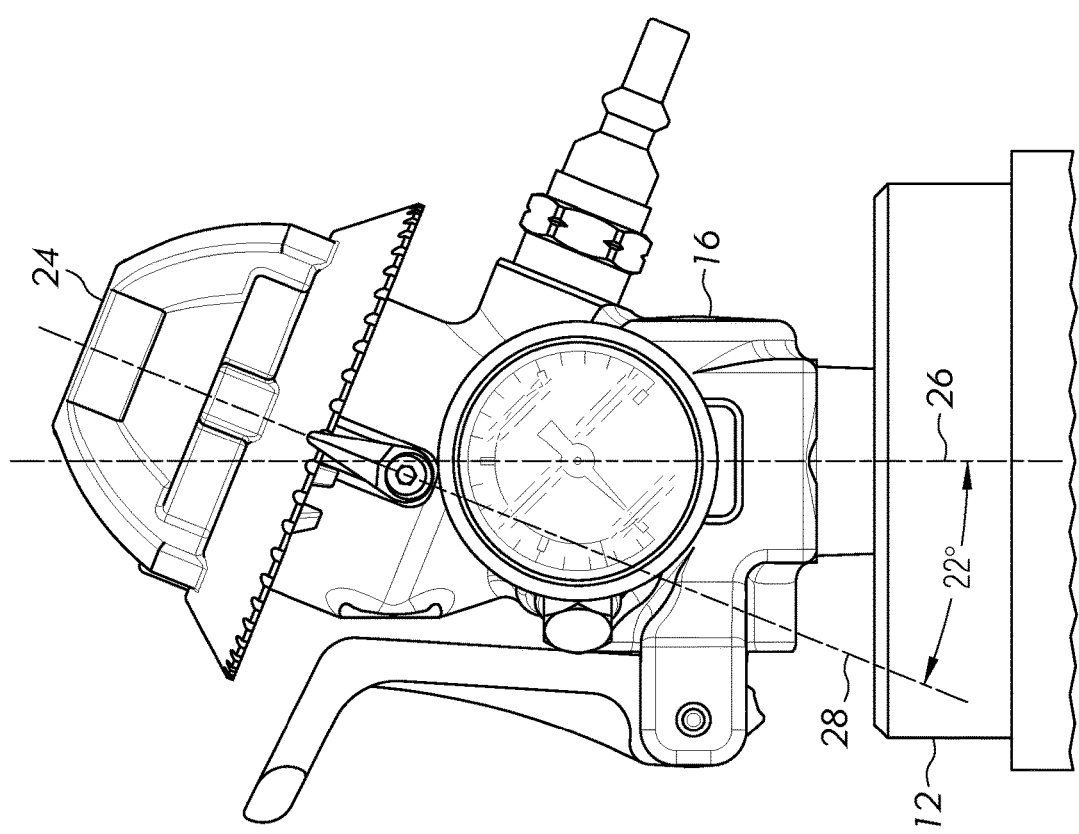
FIG. 2 shows the VIPR along with an angle of a handwheel of the VIPR.

The handwheel 24 can include setting levels and/or graduations printed on the handwheel, and the VIRP can include an indicator or pointer directed to the graduations, to inform the operator of the current setting. In an example embodiment, the handwheel 24 provides for single turn regulation from minimum to maximum outlet flow or pressure. In further embodiments, the handwheel 24 can provide a multi-turn operation. The size of the handwheel 24, (e.g., diameter and height) can allow for ease of handling by the operator when wearing gloves. The handwheel 24 and upper portion of the VIPR body 16 are oriented at an acute angle (e.g., tilted or slanted) relative to the generally vertical axis of the cylinder 12 and the lower portion of the VIPR body. This sloping design makes operating the handwheel 24 and reading the handwheel setting easier and more suitable for various sizes of gas cylinders as compared to a conventional VIPR. For example, the sloping design allows the setting of the handwheel 24 to be read from both the front of the cylinder 12 and the lateral side of the cylinder and from the top of the cylinder (e.g., when used on small cylinders having open guards). FIG. 2 shows an example angle of 22 degrees of tilt or offset between the longitudinal axis 26 of the cylinder 12 and the lower portion of the VIPR body 16 and the axis 28 of operation of the handwheel 24 and the upper portion of the VIPR body. That is, the axis 28 of the handwheel 24 and the upper portion of the VIPR body 16 is tilted downward 22 degrees from vertical or the axis 26 of the cylinder 12. The handwheel 24 thus has an axis 28 of operation that is nonparallel and non-perpendicular with the axis 26 of the cylinder. The handwheel 24 can be tilted downward from vertical at various acute angles or ranges of angles, such as 70 degrees or less, 45 degrees or less, or 30 degrees or less, between 20 degrees and 70 degrees, etc. The 22 degree tilt angle shown in FIG. 2 is merely exemplary. Portions of the pressure or flow regulating valve within the VIPR body 16, such as a valve member, seat, springs, diaphragm components, etc., can be oriented at the same angle or along the same axis 28 as the handwheel 24 (e.g., in-line with the handwheel).

Figure 3:
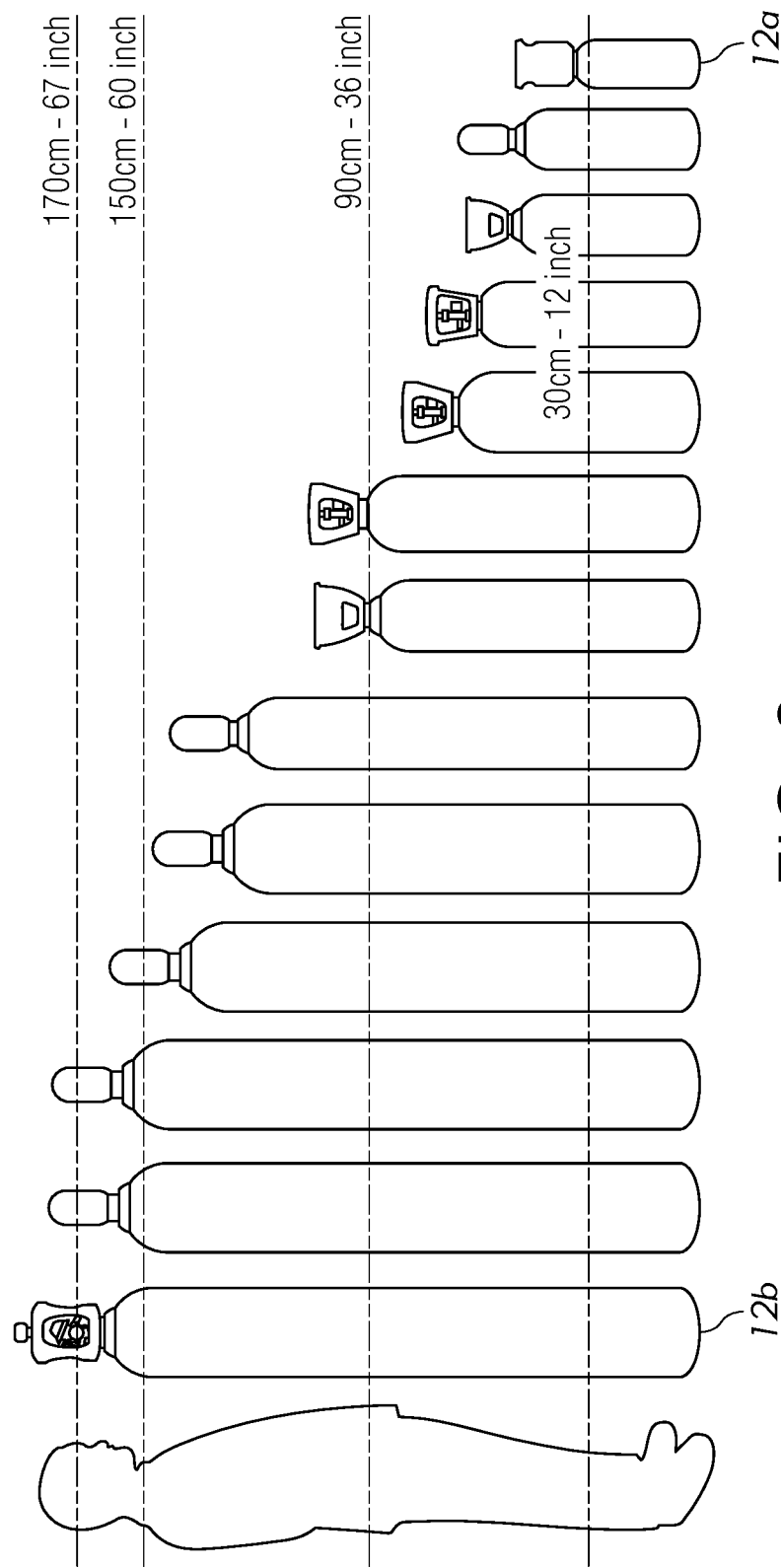
FIG. 3 shows example gas cylinder sizes.

Turning to FIG. 3, the VIPR 10 has a compact, ergonomic design that is suitable for various sizes of gas cylinders. FIG. 3 shows an example range of gas cylinder heights with which the VIPR 10 can be used, from approximately 12 inch (30 cm) cylinders 12*a* to approximately 60 inch (150 cm) cylinders 12*b*, or even taller cylinders (e.g., 170 cm/67 inches or greater). When installed on a cylinder, all of the primary functions of the VIPR are assessable from the front and/or top of the cylinder without having to turn the cylinder.

Conventional VIPRs may be designed for use with one cylinder size, and different VIPR products may be produced for large and small cylinders. If the VIPR is intended for a large or tall cylinder, access to the valve is on the lateral sides, and all of the functions are aligned horizontally. If the VIPR is intended for small cylinders, preferred access is from top as well as the sides, and the functions are both aligned horizontally and vertically. The offset handwheel 24 of the VIPR 10 discussed herein allows to lower the product height and minimize the lateral encumbrance. Ergonomics takes advantage from this; one can access all of the functions both from the lateral sides as well from top. Also the regulator scale printed on the handwheel is inclined to allow easy reading from different sides. Advantages provided by the VIPR 10 can include a smaller, more compact product with respect to traditional VIPRs having vertical/horizontal alignments; the VIPR can fit on most of the existing protections (guards) on the market (no need for a custom guard); good compromise for ergonomics, allowing access from the lateral sides on large tall cylinders and also from the top on small cylinders; a single product version that can be used with large and small cylinders; and permits the regulator setting to be read both from the side and top.

Figure 5:
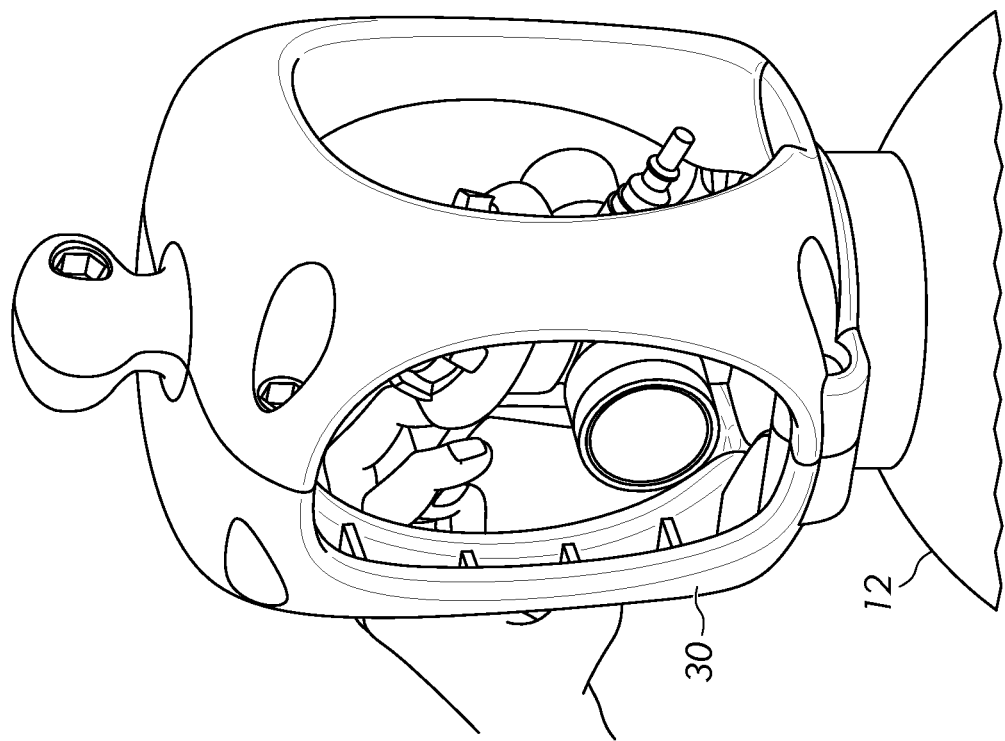
FIG. 5 shows the VIPR mounted to a gas cylinder.
Figure 4:
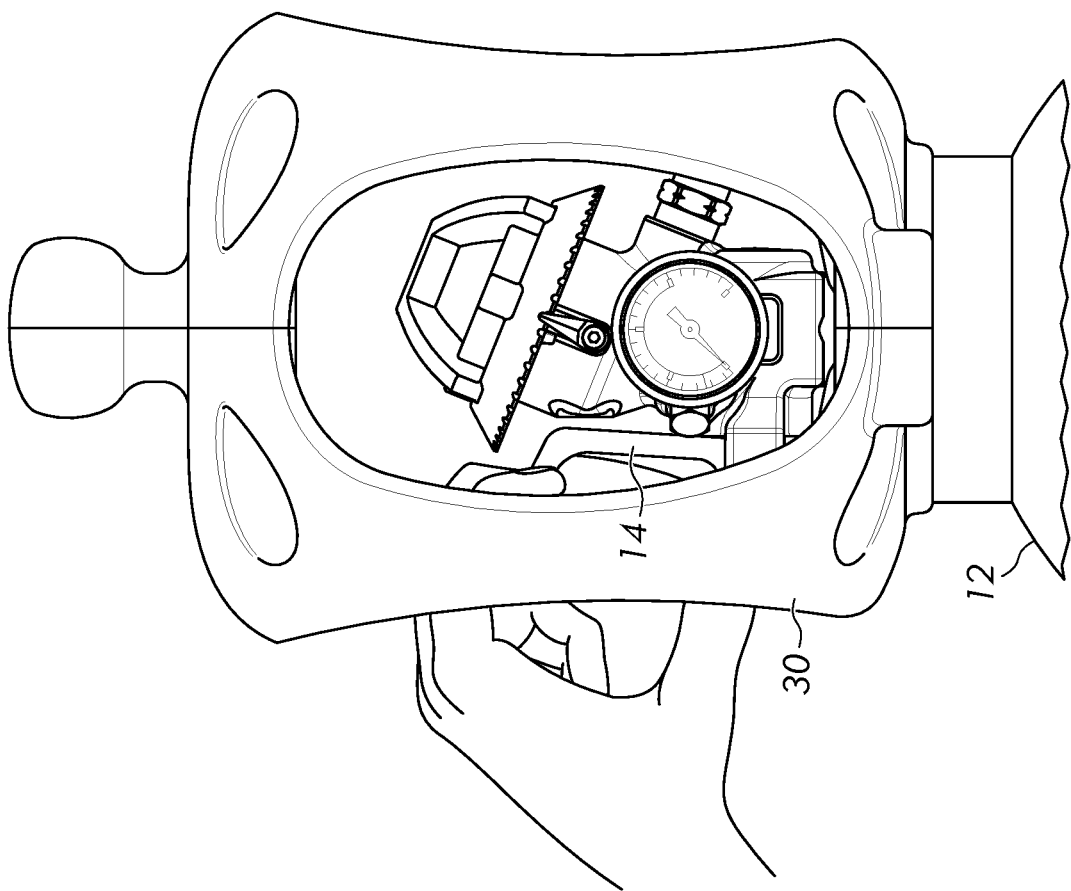
FIG. 4 shows the VIPR mounted to a gas cylinder.
Figure 7:
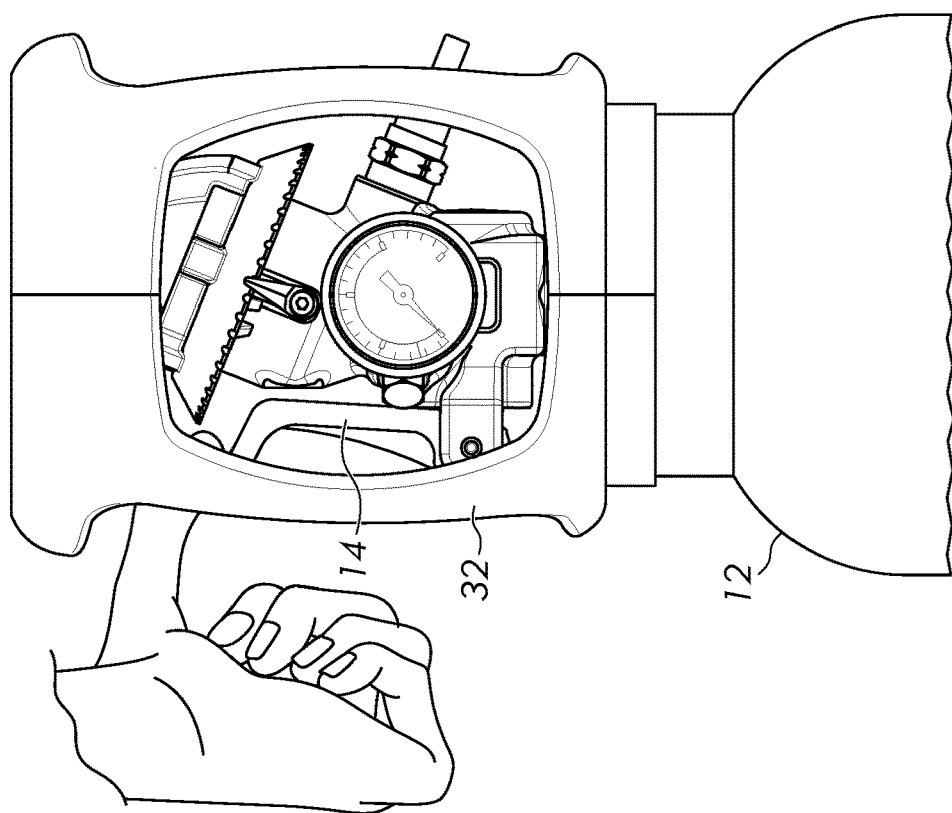
FIG. 7 shows the VIPR mounted to a gas cylinder.
Figure 6:
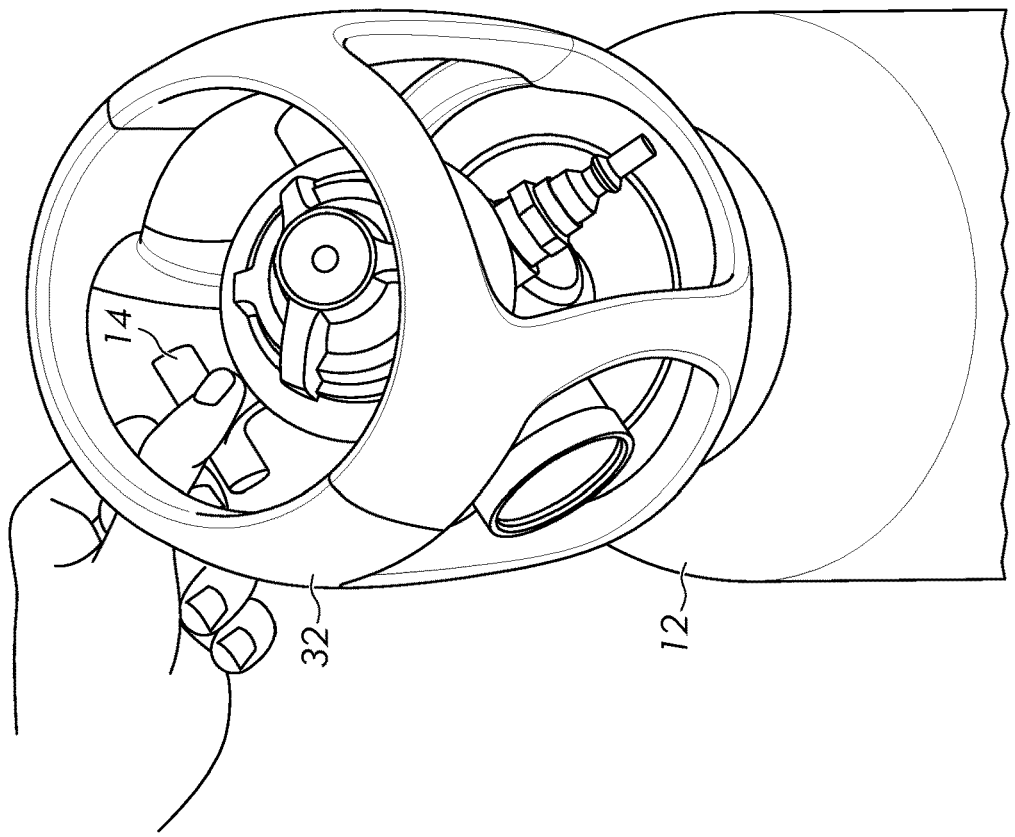
FIG. 6 shows the VIPR mounted to a gas cylinder.
Figure 9:
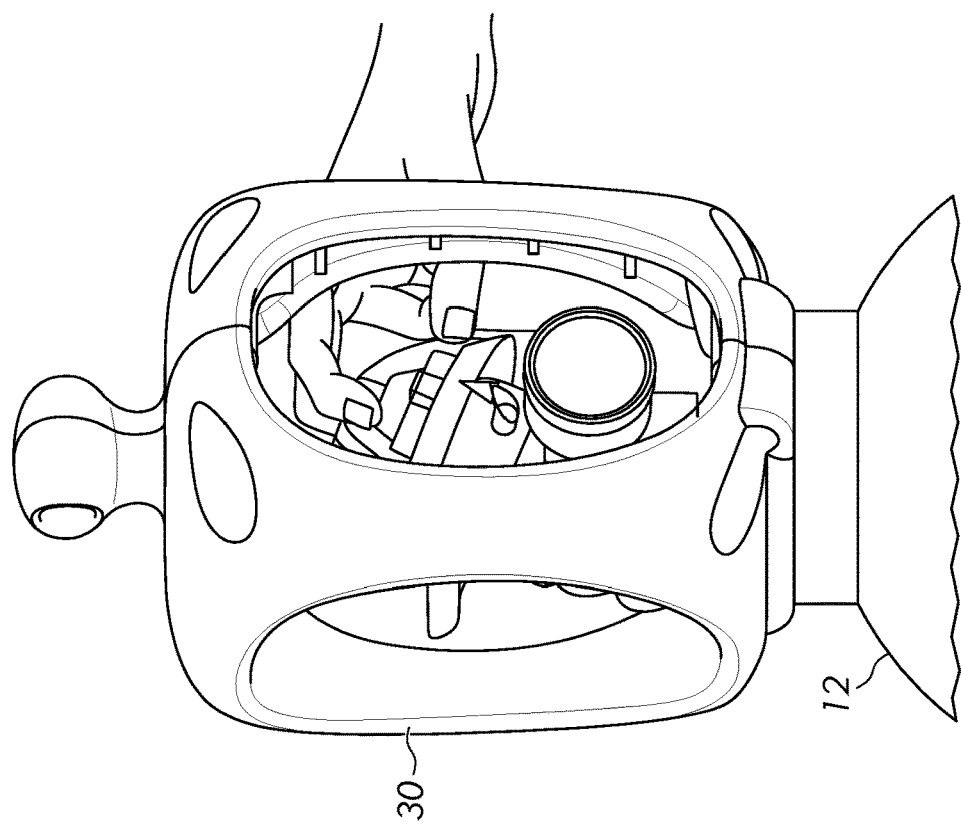
FIG. 9 shows the VIPR mounted to a gas cylinder.
Figure 8:
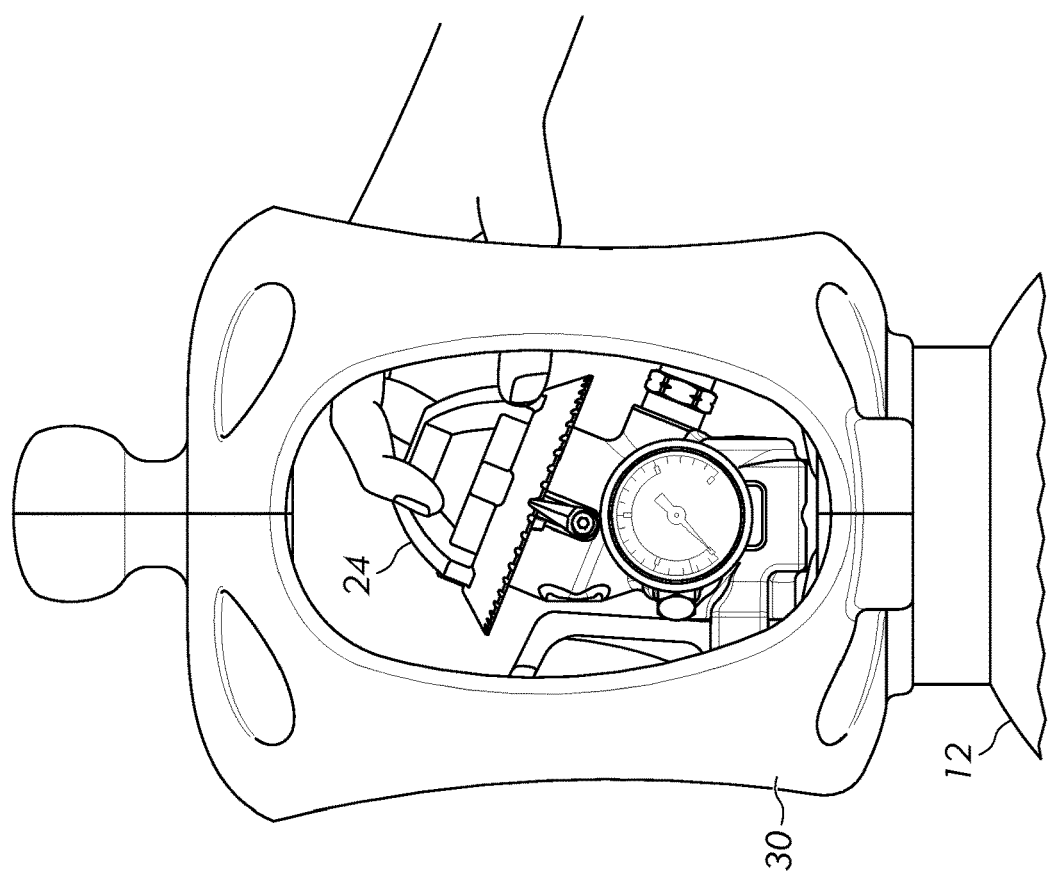
FIG. 8 shows the VIPR mounted to a gas cylinder.
Figure 11:
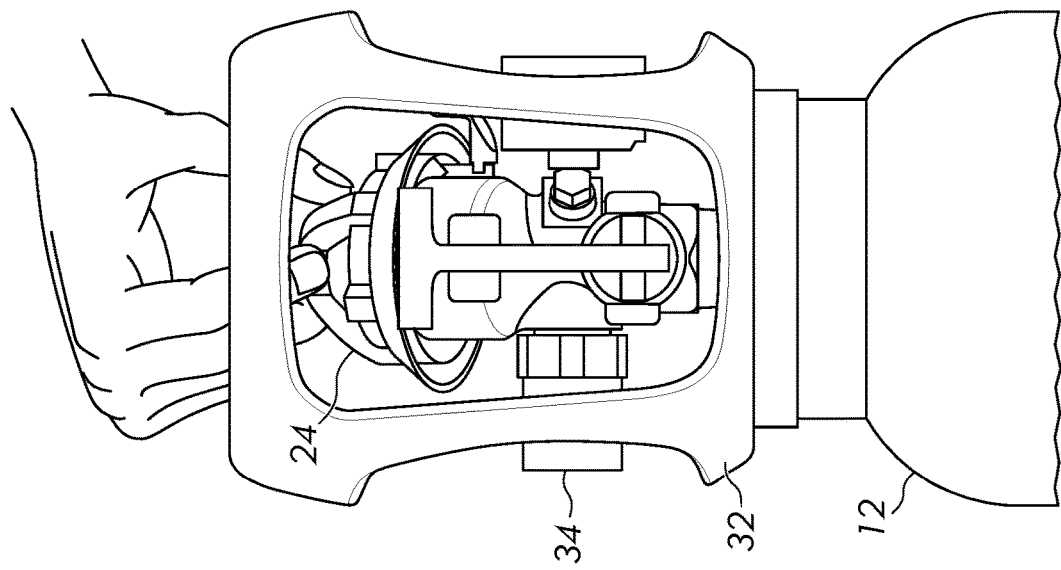
FIG. 11 shows the VIPR mounted to a gas cylinder.
Figure 10:
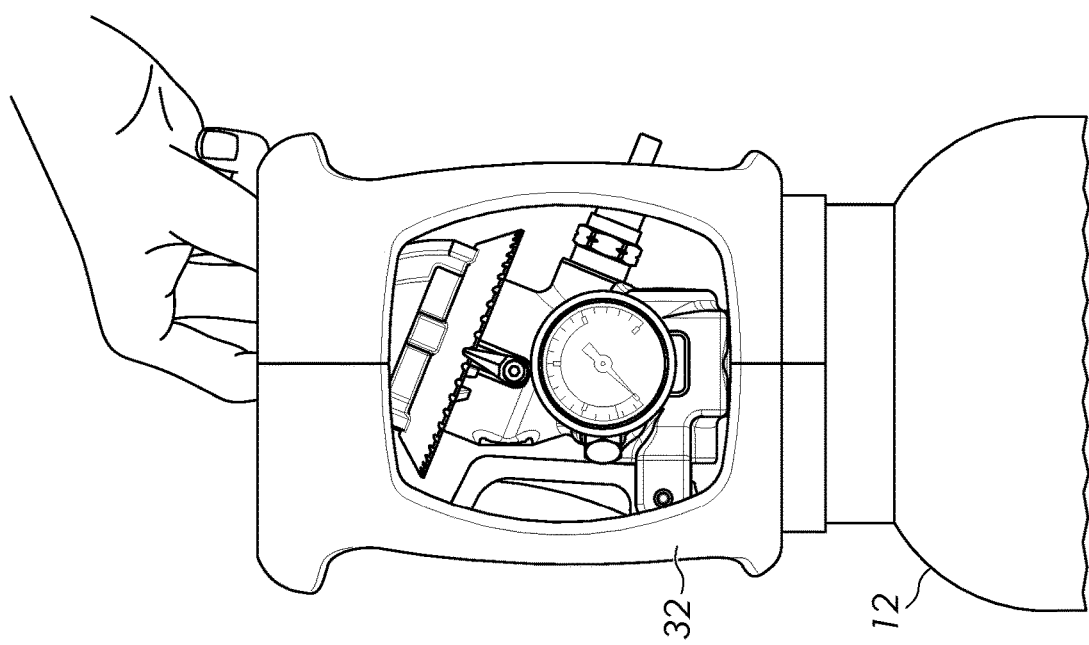
FIG. 10 shows the VIPR mounted to a gas cylinder.

FIGS. 4 and 5 show the VIPR 10 mounted to a large gas cylinder 12, such as a cylinder between approximately 36 inches (90 cm) tall and 60 inches (150 cm) tall or more. The VIPR 10 is surrounded by a protective guard 30 that is closed at the top. Access to the VIPR 10 is provided through openings in the sides of the guard 30, and the VIPR is ergonomically designed to be operated through the openings when they are located around head level. FIGS. 6 and 7 show the VIPR 10 mounted to a smaller gas cylinder 12, such as a cylinder less than 36 inches (90 cm) tall. The VIPR 10 is surrounded by a guard 32 that is open on the top and sides, and the VIPR is accessible though the top and sides of the guard. FIGS. 4-7 show the lever 14 being operated to open the VIPR. The operable end of the lever 14 is T-shaped (e.g., has a T-shaped grip), which allows the lever to be operated via a finger pull as shown in FIGS. 4 and 5 (e.g., when the VIPR is located around head level) or via a thumb push as shown in FIGS. 6 and 7 (e.g., when the VIPR 10 is located around waist level or below). The T-shape of the operable end of the lever 14 allows the lever to be short in length and compact. The T-shaped grip allows the user to apply the necessary effort to move the lever in an easy way, e.g. with 2 fingers, or with a thumb push by having enough space/surface to place the thumb. In other words, T-shape ergonomy provides a better grip and allows for the easy application of force to the lever 14. The shortened length of the lever 14 is generally more compact as compared to convention VIPRs, requiring less material to manufacture it, and is less sensitive to external shocks or less susceptible to bending/breaking. FIGS. 8 and 9 show the operation of the handwheel 24 through the openings in the sides of the guard 30 on a large gas cylinder 12. FIGS. 10 and 11 show the operation of the handwheel 24 through the opening in the top of the guard 32 on a smaller cylinder 12. The T-shape of the lever 14 can be clearly seen in FIG. 11, along with a filling port 34 on the rear side of the VIPR body for filling the cylinder 12.

Figure 13:
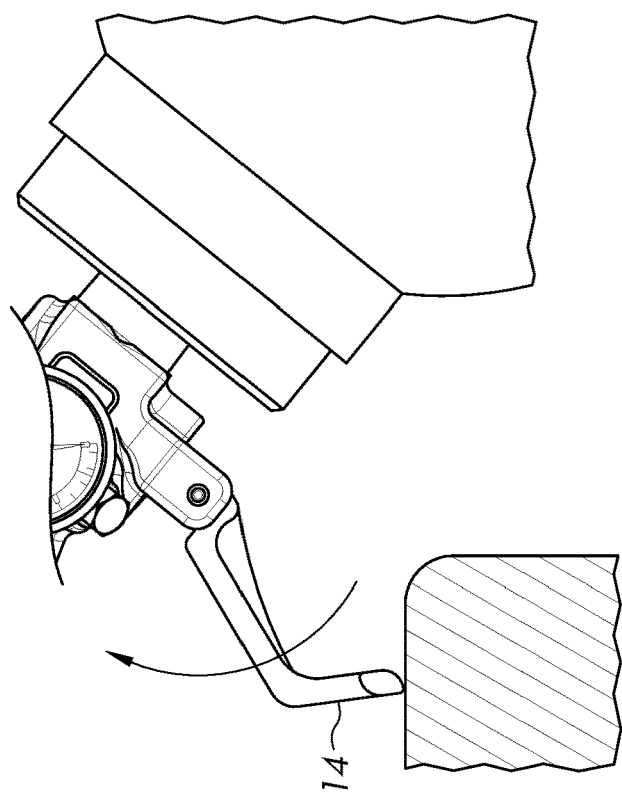
FIG. 13 illustrates an operation of an ON/OFF lever of the VIPR.
Figure 12:
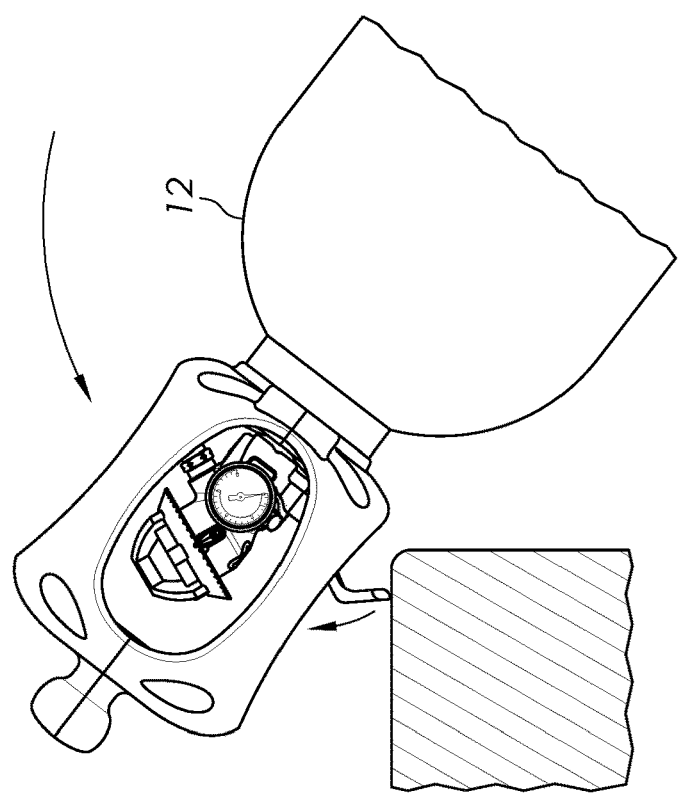
FIG. 12 illustrates an operation of an ON/OFF lever of the VIPR.

FIGS. 12 and 13 show the effect of the lever 14 design with respect to the cylinder 12 tipping over. The upward movement of the lever 14 to close the shut off valve in the VIPR 10 can be triggered when the cylinder 12 is tipped over toward the lever. The lever 14 protrudes beyond the side opening in the guard and the lever can strike a surface when the cylinder 12 is tipped, which pushes the lever upward closing the shut off valve in the VIPR 10 and lowering the risk of breaking the lever. Conventional VIPRs typically have an operating lever having a pivoting point toward the top of the VIPR, and the shut off valve is opened by lifting the lever. This places the high pressure components within the VIPR toward the top of the VIPR body, and they are susceptible to shocks due to their distance from the top of the cylinder. Conventional VIPRs often have operating levers that are designed to break when the cylinder tips over in order to minimize the forces transferred to the cylinder or valve. Rather than breaking or needing a default weak area to facilitate breaking, the lever 14 discussed herein is hinged toward the bottom of the VIPR body (near the top of the cylinder 12) and can flip up or down should the cylinder tip over. Such a configuration automatically stops the flow of gas from the cylinder upon tipping and better protects the high pressure components within the VIPR from shocks (the lower part of the VIPR near the cylinder is tougher/harder to break). FIG. 14 illustrates the intermediate valve open position of the lever, and the downward movement of the lever 14 to close the shut off valve in the VIPR 10. FIG. 14 also illustrates the lever 14 in the downward second valve closed position, for comparison with the upward first valve closed position shown in other figures.

Figure 15:
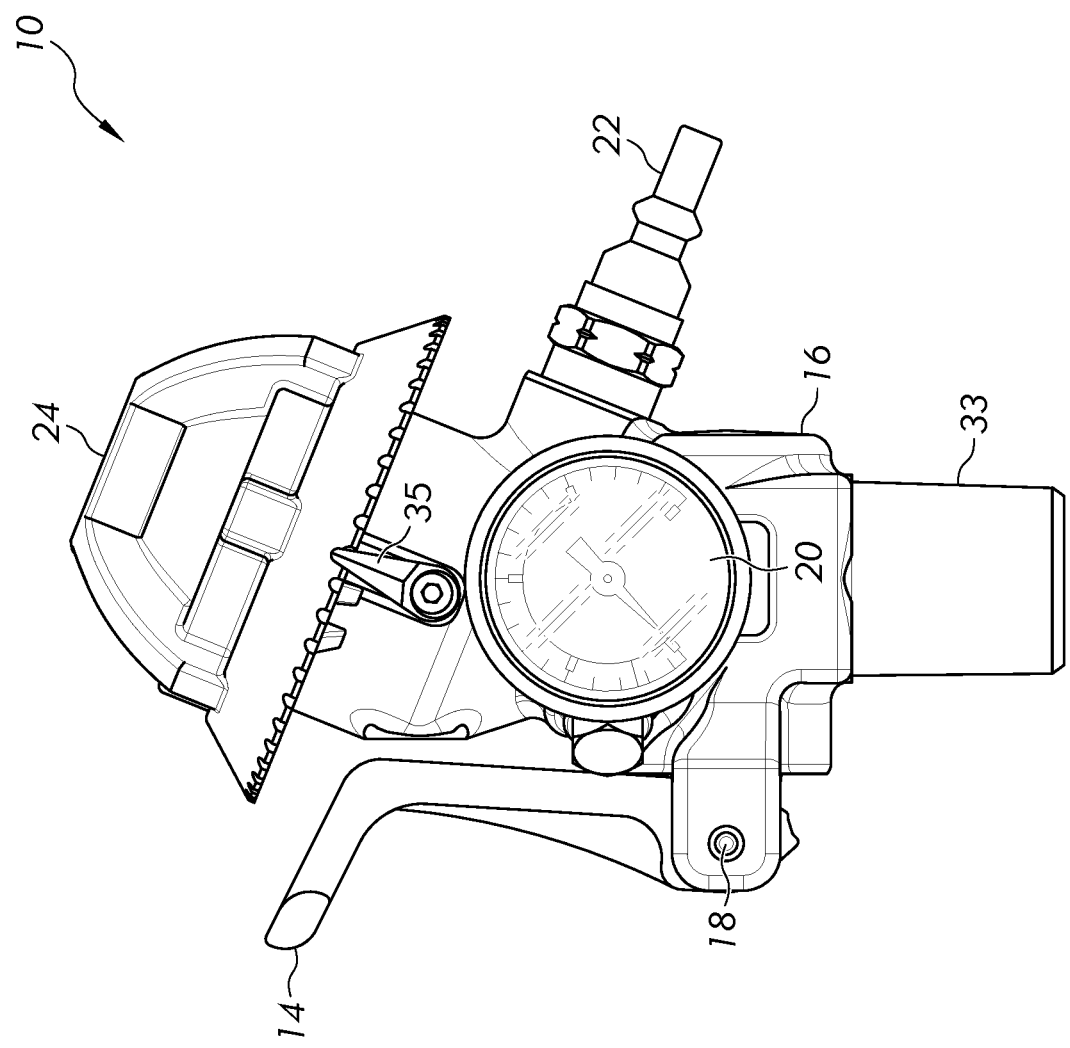
FIG. 15 is a front view of the VIPR.
Figure 16:
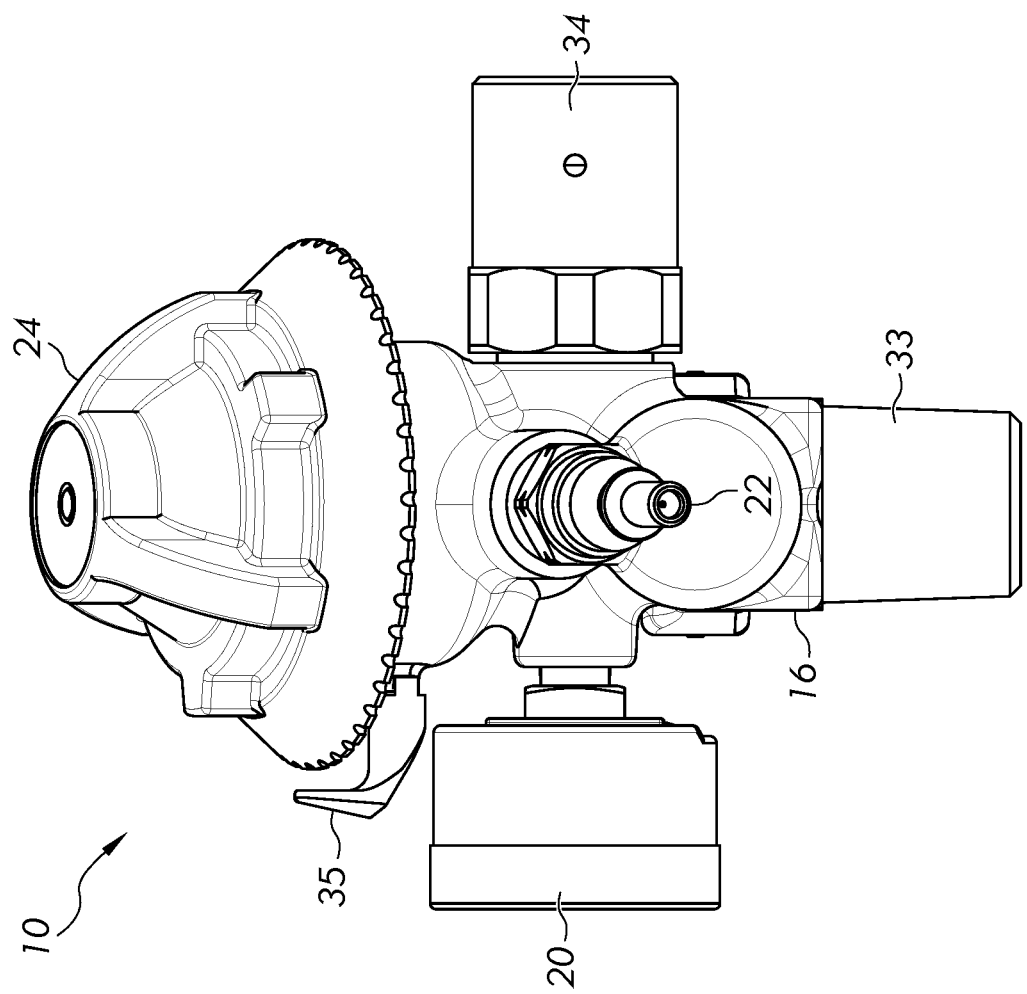
FIG. 16 is a side view of the VIPR.

FIG. 15 provides a front view of the VIPR 10 without the cylinder, and FIG. 16 provides a side view of the VIPR without the cylinder. The VIPR 10 can include an inlet connection 33 for attaching the VIPR to the gas cylinder. The inlet connection 33 may be a threaded connection or include other suitable attachment structure. The setting indicator 35 (e.g., flow or pressure scale indicator) for the handwheel 24 is shown in both FIGS. 15 and 16. The setting indicator 35 extends outward from the VIPR main body 16 and bends upward past the circumferential edge of the handwheel 24. The setting indicator 35 can be oriented to point along the same axis as the handwheel axis of operation, or along another axis (e.g., vertical) if desired.

Figure 17:
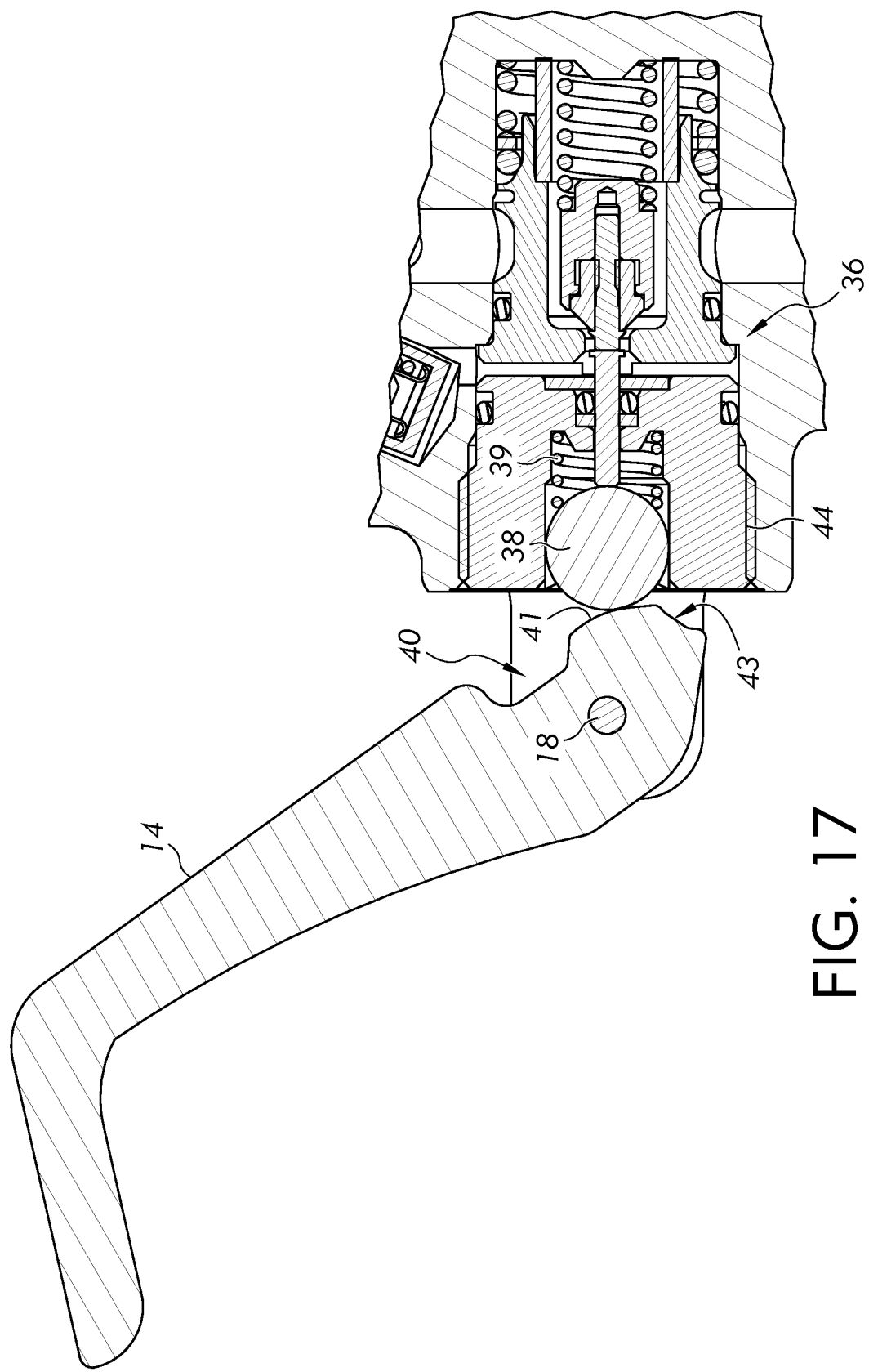
FIG. 17 shows a partial cross-sectional view of the VIPR.

FIG. 17 shows details of a portion of the shut off valve 36 in the VIPR 10 and how it is operated by the lever 14. In particular, FIG. 17 shows the mechanism for actuating the shut off valve 36. The shut off valve 36 includes a ball 38 that operates as a tappet or cam follower. The ball tappet 38 actuates the shut off valve via a valve stem. The ball tappet 38 pushes on the valve stem to open the valve as the ball translates linearly within the VIPR body. The ball tappet 38 is biased toward the lever 14 by a spring 39. Rotating the lever 14 to the open, generally horizontal position pushes the ball tappet 38 inward by a cam surface 41 on the lever, which compresses the spring and allows the ball to laterally move the valve stem to open the valve. The end of the valve stem projects axially within the spring 39 toward the ball tappet 38. The lever 14 includes a slot 40 and cam surface(s) 41 that interact with the ball tappet 38 as the lever is rotated to translate the ball tappet linearly and actuate the shut off valve 36. When the lever 14 is in the upward closed position, the slot 40 is aligned with the ball tappet 38 and the ball is spring-biased toward the slot by the bias spring 39 to close the valve. The ball tappet 38 is moved by the cam surface(s) 41 on the lever 14 just below the slot 40 as the lever is rotated. When the lever 14 is in the downward closed position, the ball tappet 38 is pushed away from the valve 36 and its stem and against the cam surface 41 of the lever by the spring 39, thereby closing the valve. The cam surface(s) 41 on the lever 14 include a concave portion or detent 43 for holding the lever in the valve open position against the bias force of the ball tappet 38. The ball tappet 38 and bias spring 39 can be located within a plug member 44 inside of the VIPR main body.

The ball tappet 38 provides a low friction load for the operation of the valve 36 (e.g., the valve operation works in a pseudo-rolling friction instead of pure dynamic friction). The ball tappet 38 has a single circumferential point of contact within the cylindrical recess in the VIPR in which it operates, which minimizes the risk of the ball seizing within the recess (e.g., seizing in the open position and holding the shut off valve 36 open). Conventional tappets are often cylindrical pistons with a flat surface that contacts the cam on the lever. Such a structure leads to a variable effort needed for opening during rotation of the lever, and can increase the "lateral" loads. The point of contact will move proportionally with the lever angle, continuously changing the lever ratio from a high effort to a lower effort. Lateral loads will displace a cylindrical cam follower, increasing loads on its point of contact, thus friction is increased with the risk of seizure. Lubrication of the parts is fundamental to avoid such events. By using a ball tappet 38 rather than a cylindrical piston, user effort is more uniform along the entire rotation of the lever due to better distribution of the contact point with the cam surface 41, friction loads and risk of seizing are reduced, and lubrication is unnecessary. In certain embodiments, the ball 38 has an industry standard size to minimize its cost. Moreover, the use of a ball 38 as a tappet makes assembly of the VIPR easier since the ball requires a minimal amount of intentional orientation to correctly place the ball in the cylindrical recess in the VIPR.

Figure 18:
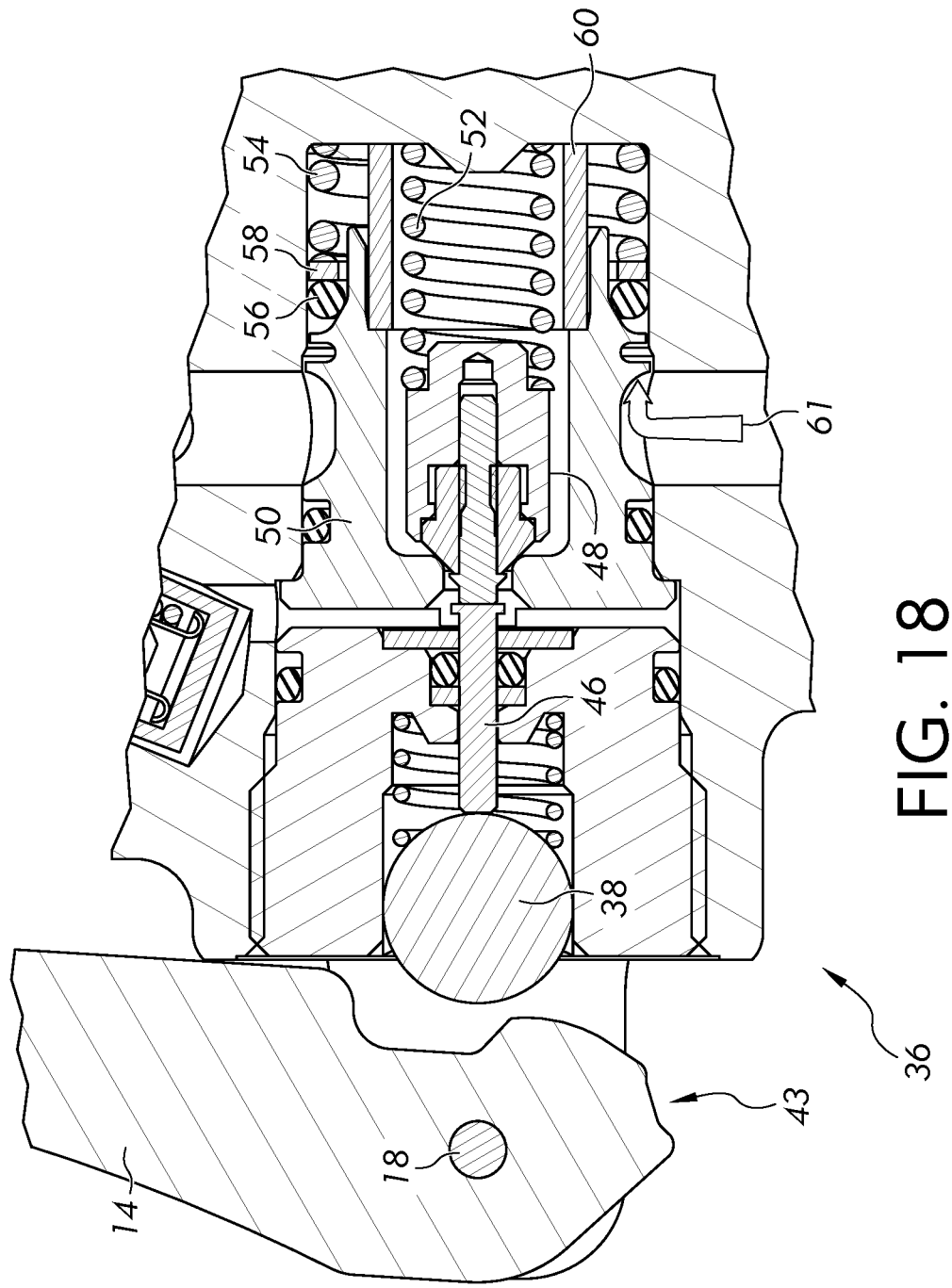
FIG. 18 shows a partial cross-sectional view of the VIPR.

FIG. 18 shows the shut off system for the VIPR comprising the lever 14 and shut off valve 36 and also the components of a residual pressure valve (RPV) (also referred to as a residual pressure device RPD) just upstream of the shut off valve. The shut off valve 36 includes a valve stem 46 that is attached to a movable valve member 48 or shutter. The movable valve member 48 moves within a valve seat 50 to open and close and allow/stop fluid flow to a downstream pressure or flow regulator. The movable valve member 48 is biased against the seat 50 by a valve spring 52. The ball tappet 38 opens the shut off valve 36 by pushing the valve stem 46 (and indirectly the movable valve member 48) as the lever 14 is rotated.

The RPV includes a bias spring or RPV spring 54 and an O-ring 56 that acts as a valve member or shutter. The RPV can also include a ring 58 or washer located between the RPV spring 54 and the O-ring 56. The RPV spring 54 biases the O-ring against the valve seat 50. A cylindrical filter 60 (e.g., a bronze filter) is located radially between the RPV and the shut off valve 36. In the example embodiment shown, the filter 60 surrounds the valve spring 52 and is itself surrounded by the RPV. The RPV is configured to supply fluid from the cylinder to the shut off valve 36 through the filter 60 while maintaining a positive fluid pressure in the cylinder. The RPV will normally be open to allow fluid (e.g., gas) to flow from the cylinder through the filter 60 and into the valve seat 50 as long as there is adequate pressure in the cylinder. Fluid flow 61 from the cylinder to the RPV is shown schematically in FIG. 18. The RPV is located coaxially with the shut off valve 36 and its components, and upstream of the shutoff valve. This integration reduces the number of components needed to maintain residual pressure and also the complexity of the remaining components, as well as the required machining on the VIPR body 16, thus reducing the size of the VIPR and its manufacturing costs. The upstream position of the RPV provides for the correct testing of leakages at the ON/OFF valve during manufacturing and at users' facilities (at gas filling operations at a final user site), eliminating the possibility of having false negatives. Within the VIPR body 16, the shut off valve 36 and the RPV are oriented transverse or perpendicular to the longitudinal axis 26 of the cylinder 12 (FIG. 2).

Figure 19:
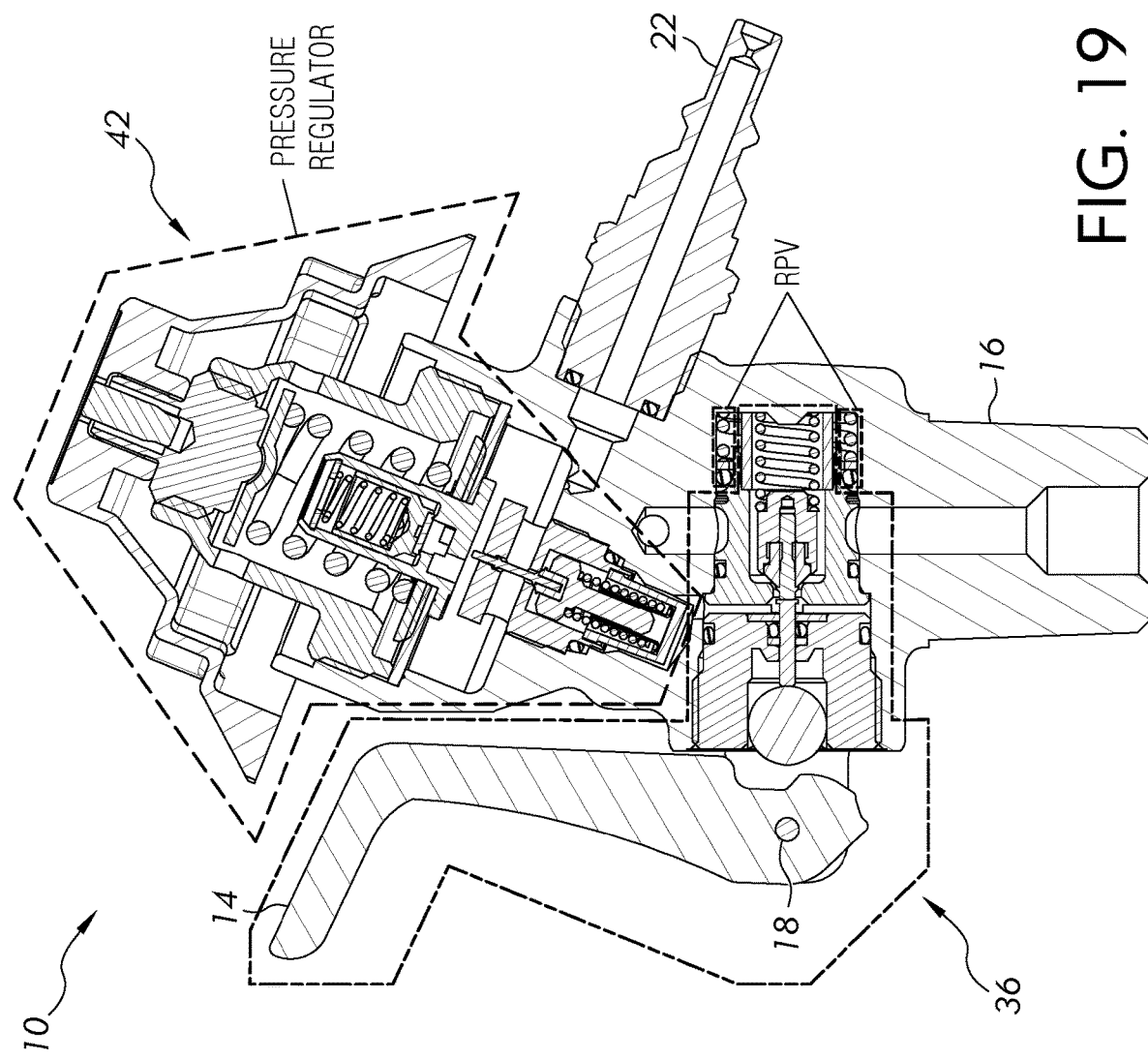
FIG. 19 shows a cross-sectional view of the VIPR.
Figure 20:
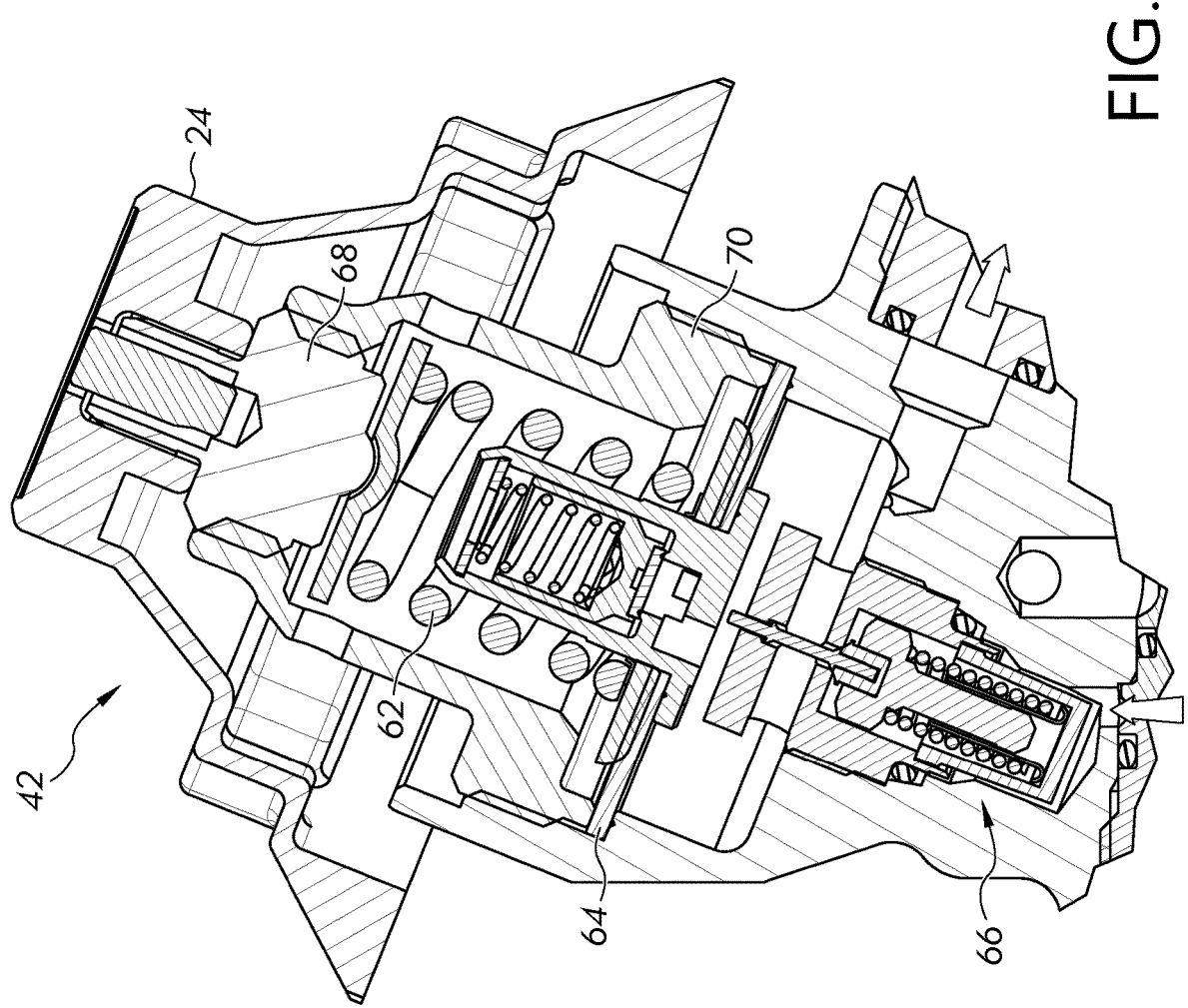
FIG. 20 shows a partial cross-sectional view of the VIPR.

FIG. 19 is a cross-sectional view of the VIPR 10. In FIG. 19, the shut off system comprising the lever and the shut off valve 36 and adjacent RPV are shown, along with the downstream, axially-offset (e.g., tilted) pressure or flow regulating valve, such as pressure regulator 42. FIG. 20 shows the pressure regulator 42 in further detail. It can be seen that the pressure regulator 42 is a diaphragm-based regulator that is controlled by the position of the handwheel 24. The pressure regulator 42 includes a regulator spring 62, a sensing element such as a diaphragm 64, and a valve assembly 66 operated by the diaphragm. In particular, the operation of the valve assembly 66 is controlled by the regulator's pressure setpoint as established by the spring 62 and diaphragm 64, and the valve assembly 66 is attached to and movable by the diaphragm 64. The spring 62 is a biasing member that applies a bias force against the diaphragm 64, which tends to open the valve 66 when the regulated output pressure is less than the pressure setpoint. The pressure setpoint can be adjusted by turning regulator screw 68 via the handwheel 24, and the regulator screw 68 adjusts the spring load on the diaphragm 64. The pressure regulator 42 can include a cover or bonnet 70 that contains the regulator spring 62. The regulator screw 68 extends through the bonnet 70, and the regulator screw can be a single-turn screw. The operation of diaphragm pressure regulators is known and need not be discussed in detail herein. In further embodiments, the pressure regulator 42 could be a piston-based regulator.

The pressure or flow regulating valve in the VIPR (e.g., pressure regulator 42) is located higher along the VIPR main body 16 than the shut off valve 36, the RPV, the ball tappet, and the lever hinge pin 18 (see FIG. 19). Such a configuration places the high pressure components within the VIPR 10 toward the bottom of the body 16 and closer to the gas cylinder, which better protects the high pressure components from shocks (the lower part of the VIPR near the cylinder is tougher/harder to break).

Figure 21:
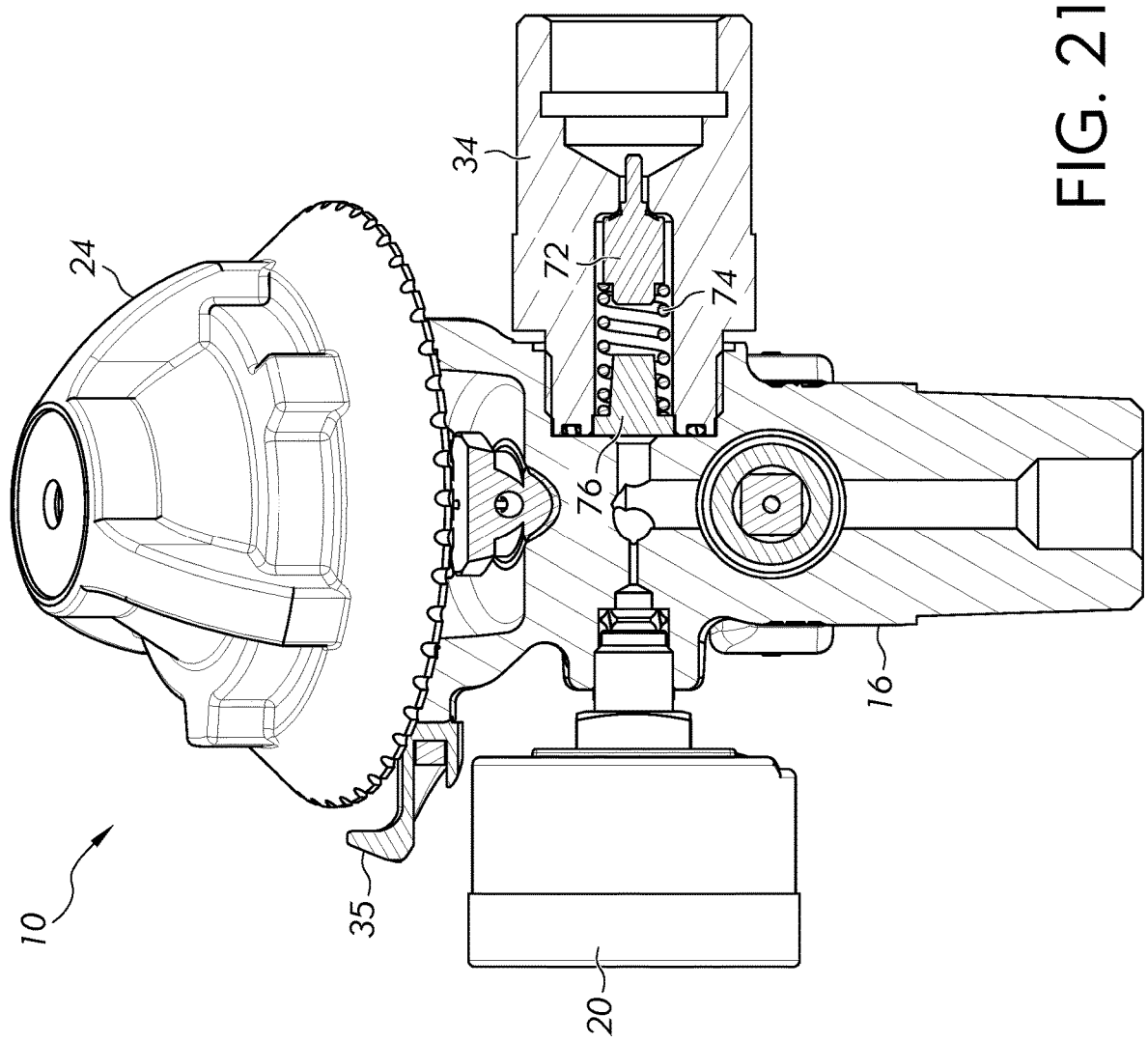
FIG. 21 shows a cross-sectional view of the VIPR.

FIG. 21 is a cross-sectional view of the VIPR that shows the filling port 34 in detail. The filling port 34 can include a valve member or shutter 72 that is biased closed by a spring 74. The filling port 34 can also include a filter 76, such as a bronze filter for example.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A regulating valve device for a fluid cylinder, comprising:
   a shut off valve having a shutter movable within a valve seat, a valve stem attached to the shutter, and a ball tappet that opens the shut off valve by pushing the valve stem which moves the shutter within the valve seat;
   a lever having a cam surface that contacts the ball tappet, wherein the cam surface interacts with the ball tappet as the lever is rotated to translate the ball tappet linearly and actuate the shut off valve, wherein the lever is manually rotatable from a first valve closed position through a valve open position to a second valve closed position and manually rotatable from the second valve closed position through the valve open position to the first valve closed position such that the valve open position of the lever is intermediate of the first valve closed position and the second valve closed position;
   a pressure regulating valve downstream of the shut off valve and including a diaphragm, a regulator spring that applies a bias force against the diaphragm, and a regulator screw that adjusts the bias force;
   a handwheel operatively connected to the regulator screw to adjust a setting of the pressure regulating valve, wherein the handwheel, regulator spring, and regulator screw are aligned along a same axis of operation that is offset from a longitudinal axis of the fluid cylinder by an acute angle;
   a residual pressure valve upstream of the shut off valve, wherein the residual pressure valve is configured to supply fluid from the fluid cylinder to the shut off valve while maintaining a positive pressure in the fluid cylinder; and
   a lever hinge pin, wherein the pressure regulating valve is located higher on the regulating valve device, and further away from the fluid cylinder, than each of the lever hinge pin, the shut off valve, the residual pressure valve, and the ball tappet.

2. The regulating valve device for a fluid cylinder of claim 1, wherein the ball tappet is spring-biased toward the lever, and the cam surface includes a detent for holding the lever in the valve open position.

3. The regulating valve device for a fluid cylinder of claim 1, wherein an end of the lever is T-shaped.

4. The regulating valve device for a fluid cylinder of claim 1, wherein the residual pressure valve is coaxial with the shut off valve.

5. The regulating valve device for a fluid cylinder of claim 1, wherein the shut off valve and the residual pressure valve are oriented transverse to the longitudinal axis of the fluid cylinder.

6. The regulating valve device for a fluid cylinder of claim 1, wherein the acute angle is 30 degrees or less.

7. The regulating valve device for a fluid cylinder of claim 1, further comprising a discharge port having a quick connect fitting, wherein the quick connect fitting comprises a demand valve.

8. A regulating valve device for a fluid cylinder, comprising:
   a main body;
   a shut off valve having a shutter movable within a valve seat, a valve stem attached to the shutter, and a ball tappet located within the main body that opens the shut off valve by pushing the valve stem which moves the shutter within the valve seat;
   a residual pressure valve located within the main body and that is configured to supply fluid from the fluid cylinder to the shut off valve;
   a lever extending from the main body and having a cam surface that contacts the ball tappet, wherein the cam surface interacts with the ball tappet as the lever is rotated to translate the ball tappet linearly within the main body, wherein the lever is manually rotatable from a first valve closed position through a valve open position to a second valve closed position and manually rotatable from the second valve closed position through the valve open position to the first valve closed position such that the valve open position of the lever is intermediate of the first valve closed position and the second valve closed position;
   a lever hinge pin, wherein the lever rotates around the lever hinge pin; and
   a pressure or flow regulating valve downstream of the shut off valve and located higher along the main body, and further away from the fluid cylinder, than each of the shut off valve, the ball tappet, the residual pressure valve, and the lever hinge pin.

9. The regulating valve device for a fluid cylinder of claim 8, wherein the ball tappet is spring-biased toward the lever, and the cam surface includes a detent for holding the lever in the valve open position.

10. The regulating valve device for a fluid cylinder of claim 8, wherein an end of the lever is T-shaped.

11. The regulating valve device for a fluid cylinder of claim 8, wherein the residual pressure valve is coaxial with the shut off valve.

12. The regulating valve device for a fluid cylinder of claim 8, wherein the shut off valve and the residual pressure valve are oriented transverse to a longitudinal axis of the fluid cylinder.

13. The regulating valve device for a fluid cylinder of claim 8, further comprising a handwheel operatively connected to the pressure or flow regulating valve to adjust a setting of the pressure or flow regulating valve, wherein the handwheel has an axis of operation that is offset from a longitudinal axis of the fluid cylinder by an acute angle.

14. The regulating valve device for a fluid cylinder of claim 8, further comprising a discharge port having a quick connect fitting, wherein the quick connect fitting comprises a demand valve.

15. A regulating valve device for a fluid cylinder, comprising:
a main body;
a shut off valve having a shutter movable with a valve seat, a valve stem attached to the shutter, and a ball tappet located within the main body that opens the shut off valve by pushing the valve stem which moves the shutter within the valve seat;
a residual pressure valve located within the main body and coaxial with the shut off valve;
a lever extending from the main body and having a cam surface that contacts the ball tappet, wherein the cam surface interacts with the ball tappet as the lever is rotated to translate the ball tappet linearly within the main body, wherein the lever is manually downwardly rotatable from a first valve closed position through a valve open position to a second valve closed position and manually upwardly rotatable from the second valve closed position through the valve open position to the first valve closed position such that the valve open position of the lever is intermediate of the first valve closed position and the second valve closed position;
a lever hinge pin, wherein the lever rotates around the lever hinge pin;
a pressure regulating valve downstream of the shut off valve and located higher along the main body, and further away from the fluid cylinder, than each of the shut off valve, the ball tappet, the residual pressure valve, and the lever hinge pin, wherein the pressure regulating valve includes a diaphragm, a regulator spring that applies a bias force against the diaphragm, and a regulator screw that adjusts the bias force; and
a handwheel operatively connected to the regulator screw to adjust a setting of the pressure regulating valve, wherein the handwheel, regulator spring, and regulator screw are aligned along a same axis of operation that is offset from a longitudinal axis of the fluid cylinder by an acute angle,
wherein the shut off valve and the residual pressure valve are oriented transverse to the longitudinal axis of the fluid cylinder.

16. The regulating valve device for a fluid cylinder of claim 15, wherein the ball tappet is spring-biased toward the lever, and the cam surface includes a detent for holding the lever in the valve open position.

17. The regulating valve device for a fluid cylinder of claim 15, wherein an end of the lever is T-shaped.

18. The regulating valve device for a fluid cylinder of claim 15, wherein the acute angle is 30 degrees or less.

19. The regulating valve device for a fluid cylinder of claim 15, further comprising a discharge port having a quick connect fitting, wherein the quick connect fitting comprises a demand valve.

* * * * *